United States Patent
Ranade et al.

(10) Patent No.: US 9,223,788 B2
(45) Date of Patent: Dec. 29, 2015

(54) FILE SYSTEM CONSISTENCY CHECK ON PART OF A FILE SYSTEM

(75) Inventors: Dilip Madhusudan Ranade, Maharashtra (IN); Kedar Shrikrishna Patwardhan, Maharashtra (IN)

(73) Assignee: Symantec Corporation, Mountain View, CA (US)

(*) Notice: Subject to any disclaimer, the term of this patent is extended or adjusted under 35 U.S.C. 154(b) by 164 days.

(21) Appl. No.: 12/942,753

(22) Filed: Nov. 9, 2010

(65) Prior Publication Data

US 2012/0117035 A1    May 10, 2012

(51) Int. Cl.
*G06F 17/00* (2006.01)
*G06F 17/30* (2006.01)
*G06F 11/07* (2006.01)
*G06F 7/00* (2006.01)

(52) U.S. Cl.
CPC ........ *G06F 17/3007* (2013.01); *G06F 11/0751* (2013.01)

(58) Field of Classification Search
CPC . G06F 3/067; G06F 17/30067; G06F 9/5072; G06F 11/0751; G06F 11/1451; G06F 11/1456; G06F 11/1464; G06F 12/08; G06F 12/0868; G06F 17/3007; G06F 17/30312; G06F 2212/1016; G06F 2212/461; G06F 3/0608; G06F 3/0631; G06F 3/0641; G06F 3/00
See application file for complete search history.

(56) References Cited

U.S. PATENT DOCUMENTS

| | | | |
|---|---|---|---|
| 6,763,455 B2* | 7/2004 | Hall | 713/1 |
| 7,028,158 B1* | 4/2006 | Beatty et al. | 711/202 |
| 7,546,319 B1* | 6/2009 | Srinivasan et al. | 1/1 |
| 2005/0055492 A1* | 3/2005 | Muthulingam et al. | 711/100 |
| 2007/0156877 A1* | 7/2007 | Krishnan et al. | 709/223 |
| 2008/0189343 A1* | 8/2008 | Hyer et al. | 707/205 |
| 2009/0006494 A1* | 1/2009 | Hong et al. | 707/202 |
| 2009/0024813 A1* | 1/2009 | Uysal et al. | 711/162 |
| 2010/0185690 A1* | 7/2010 | Evans et al. | 707/803 |
| 2010/0281230 A1* | 11/2010 | Rabii et al. | 711/165 |

OTHER PUBLICATIONS

Val Henson; et al., CHUNKFS: Using divide-and-conquer to improve file system reliability and repair; 6 pages, 2006.
Amit Gud, CHUNKFS: A Recovery-Driven File System Design Approach, A thesis, submitted in partial fulfillment of the requirements for the degree, Department of Computing and Information Sciences College of Engineering, Kansas State University, Manhattan, Kansas 2007, 68 pages.

* cited by examiner

*Primary Examiner* — Usmaan Saeed
*Assistant Examiner* — Yu Zhao
(74) *Attorney, Agent, or Firm* — Wilmer Cutler Pickering Hale and Dorr LLP

(57) ABSTRACT

A file system that includes multiple logical devices can be subdivided into multiple containers. The containers each include respective non-overlapping sets of the logical devices. An amount of memory allocated to a container is dynamic. A set of the containers can be selected for a file system consistency check. The file system consistency check is performed on only the set of the containers instead of on the entire file system.

12 Claims, 7 Drawing Sheets

FILE SYSTEM CONSISTENCY CHECK ON PART OF A FILE SYSTEM

BACKGROUND

Databases are susceptible to corruption/inconsistencies while they are in use. Inconsistencies can be introduced by operator error, hardware failure, a problem with controller firmware, etc.

A file system contains on-disk metadata structures that allow the file system driver to expose a multi-file, multi-directory abstraction on top of a set of storage blocks. If any of this metadata becomes corrupt, a system utility called FSCK (file system consistency check, and repair) can be run to remove file system inconsistencies. A tool commonly used to identify and fix corruptions of NTFS (New Technology File Systems) is referred to as "chkdsk."

A file system consistency check can be run in several phases; one time-consuming phase tallies blocks allocated to files against blocks on a free block list. Errors such as one block found allocated to more than one file (duplicate allocation), and blocks that are neither allocated nor on the free block list (lost blocks), are fixed in this phase. Because running a file system consistency check to repair a file system that is mounted for read/write operations can potentially cause severe data corruption/loss, the file system is normally checked while unmounted, mounted read-only, or with the system in a special maintenance mode that limits the risk of such damage. Thus, the file system may be unavailable while a file system consistency check is performed—the file system is not accessible during execution of a file system consistency check. However, with the increasing size of very large file systems (hundreds of terabytes or even petabytes in size), the time to run a file system consistency check has lengthened to days or even weeks. Because most such large systems also require availability 24 hours a day, seven days a week, the length of time needed to run a file system consistency check has become a real issue.

In summary, a problem with processes such as FSCK is that they can take a relatively long time to run. While FSCK is run, the file system may be taken offline, which makes it inaccessible to other system components and processes that rely on it.

SUMMARY

According to embodiments of the present disclosure, a file system includes multiple logical devices that are subdivided into multiple containers. The logical devices may be, for example, volumes managed by a volume manager of the file system, or devices identified by LUNs (logical unit numbers). The containers each include a respective non-overlapping set of the logical devices. That is, each of the containers includes one or more of the logical devices, and each of the logical devices is associated with a single one of the containers. The amount of memory allocated to each container is dynamic. A set (one or more) of the containers can be selected for a file system consistency check. The file system consistency check is performed on only the set of the selected containers instead of on the entire file system.

In one embodiment, a file is associated with a particular container. If the file subsequently increases in size, then a free portion of memory associated with that container can be allocated to the file. If the free portion is insufficient, then additional memory can be allocated to the container. Also, the amount of memory allocated to the container can be reduced if a measure of free memory in the container exceeds a threshold amount.

In one embodiment, inodes associated with each of the containers are identified. In such an embodiment, the file system consistency check can be constrained to a set of the inodes and hence to a set of containers.

In one embodiment, the set of containers selected for the file system consistency check is offline and inaccessible to applications, but the remainder of the containers in the file system is online and accessible to applications during the file system consistency check.

In one embodiment, the file system is a multi-tier file system. In such an embodiment, a container can include a logical device that is in one tier and a logical device that is in another tier.

In summary, according to embodiments of the disclosure, a large file system can be divided into several smaller entities (containers) such that each container can be checked and repaired independently, which leads to much faster file system consistency checks and repairs. Only a portion of the file system (specifically, the container being checked) may need to be taken offline during a file system consistency check, leaving the remainder of the file system accessible to other system components and processes.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Figure 1:
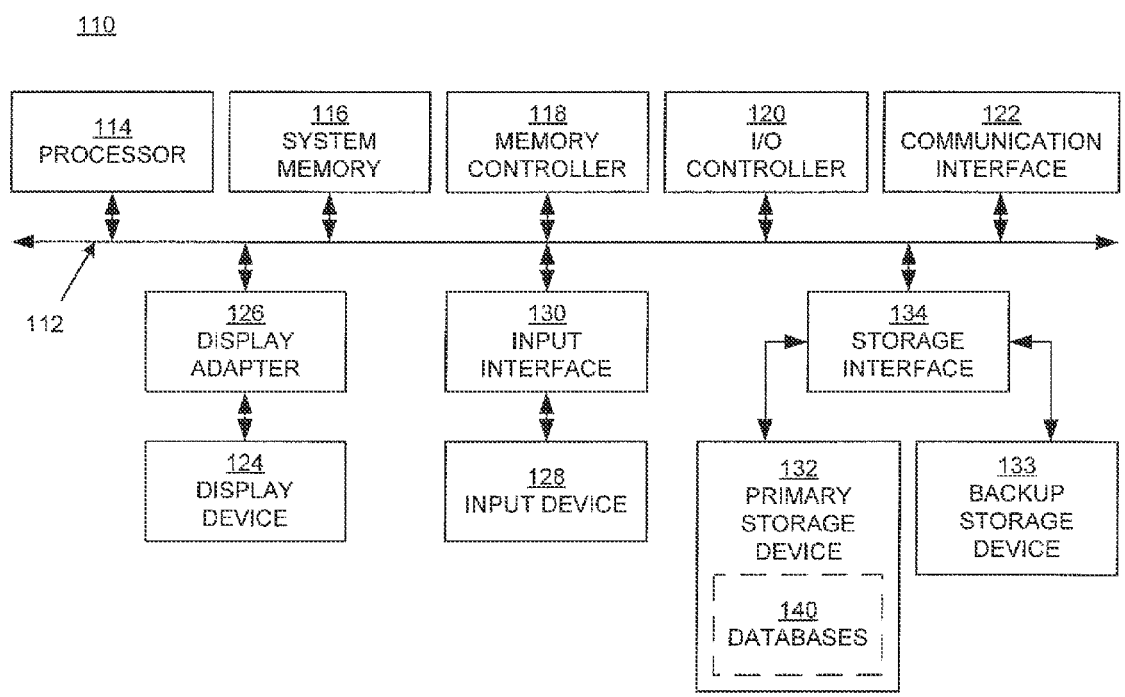
FIG. 1 is a block diagram of an example of a computer system upon which embodiments of the present disclosure can be implemented.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "accessing," "subdividing," "selecting," "completing," "associating," "allocating," "reducing," "increasing," "identifying," "constraining," "validating," or the like, refer to actions and processes (e.g., flowcharts 900 and 1000 of FIGS. 9 and 10, respectively) of a computer system or similar electronic computing device or processor (e.g., system 110 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

According to embodiments of the disclosure, a large file system is divided into several smaller entities such that each entity can be checked and repaired independently, which leads to much faster file system consistency checks and repairs. Generally speaking, a divide-and-conquer approach is used to reduce the time needed to run a file system consistency check.

More specifically, in one embodiment, the total storage space is subdivided into several variable-sized entities referred to herein as "containers." Blocks of one container are allocated to an exclusive set of files. That is, any one file is allocated blocks from at most one container. The maximum number of files that can be associated with one container is limited. A file system consistency check can then be executed on one container at a time, or on a group of containers, instead of the entire file system.

In essence, in a file system that supports multiple volumes, a larger number of small size volumes are defined instead of a smaller number of large size volumes. One or more of the smaller volumes form a container. The respective sizes of smaller volumes and hence the containers are dynamic—each can grow or shrink online. These dynamic-sized containers can also be implemented within the file system driver.

Blocks allocated to a file belonging to a container are allocated from the same container. If the container runs out of free blocks, the size of the volume is grown dynamically. That is, additional blocks can be allocated to a container as needed.

On the other hand, if a container accumulates too many free blocks (due to file truncation, etc.), the free blocks towards the end of the volumes can be reorganized and deleted, and then the sizes of the volumes can be dynamically reduced. This addresses the problem of defragmentation that can arise due to partitioning the file system space into multiple containers.

A container may be limited to a single logical device or it may include multiple logical devices. A logical device may be a virtual disk or volume assigned by a volume manager, or a LUN (logic unit number) assigned by a disk array, and appears to the file management system as a physical disk partition device. Device virtualization can also be implemented within the file system itself, as an internal virtualization module. In one embodiment, a block map or some other type of data structure used by the file system can include a descriptor (a field) that identifies the logical device(s) that store each container. Alternatively, each inode may include an identifier that identifies the logical device(s) that store each container.

In one embodiment, each container is associated with its own set of the following metadata structures: (a) a free block list; (b) an inode list or inode array; and (c) other auxiliary structures that may be required for the particular file system. There may be an upper limit N for the number of files that can be placed in one container. When a new file is to be created, it is created in a container having less than N files.

When corruption of metadata belonging to a particular container is detected or suspected, then that container only may be marked for a file system consistency check. Thus, instead of running a file system consistency check on the whole file system, only the single container that was marked for a file system consistency check is checked and repaired. Accordingly, a file system consistency check runs significantly faster because a smaller number of files and blocks are checked.

A file system consistency check can be run online, without stopping the file system, by implementing means to "freeze" only the container or containers that are being checked and repaired. Consequently, only applications that need to access files within the frozen container will be blocked while a file system consistency check is being run.

In one embodiment, a "partial file system consistency check" utility is specified to check and repair a container of interest. The partial file system consistency checks and reads a list of inodes, reads the block map associated with each of the inodes, generates an inode list per container, and constrains the file system consistency check to the inodes associated with the container of interest.

Embodiments according to the present disclosure can be used in tiered storage systems, in which performance is better but the cost is greater at higher tiers while at lower tiers the cost is reduced but so is performance, and in which containers may span multiple tiers.

FIG. 1 is a block diagram of an example of a computing system 110 capable of implementing embodiments of the present disclosure. Computing system 110 broadly represents any single or multi-processor computing device or system capable of executing computer-readable instructions. Examples of computing system 110 include, without limitation, workstations, laptops, client-side terminals, servers, distributed computing systems, handheld devices, or any other computing system or device. In its most basic configuration, computing system 110 may include at least one processor 114 and a system memory 116.

Processor 114 generally represents any type or form of processing unit capable of processing data or interpreting and executing instructions. In certain embodiments, processor 114 may receive instructions from a software application or module. These instructions may cause processor 114 to perform the functions of one or more of the example embodiments described and/or illustrated herein.

System memory 116 generally represents any type or form of volatile or nonvolatile storage device or medium capable of storing data and/or other computer-readable instructions. Examples of system memory 116 include, without limitation, RAM, ROM, flash memory, or any other suitable memory device. Although not required, in certain embodiments computing system 110 may include both a volatile memory unit (such as, for example, system memory 116) and a nonvolatile storage device (such as, for example, primary storage device 132).

Computing system 110 may also include one or more components or elements in addition to processor 114 and system memory 116. For example, in the embodiment of FIG. 1, computing system 110 includes a memory controller 118, an input/output (I/O) controller 120, and a communication interface 122, each of which may be interconnected via a communication infrastructure 112. Communication infrastructure 112 generally represents any type or form of infrastructure capable of facilitating communication between one or more components of a computing device. Examples of communication infrastructure 112 include, without limitation, a communication bus (such as an Industry Standard Architecture (ISA), Peripheral Component Interconnect (PCI), PCI Express (PCIe), or similar bus) and a network.

Memory controller 118 generally represents any type or form of device capable of handling memory or data or controlling communication between one or more components of computing system 110. For example, memory controller 118 may control communication between processor 114, system memory 116, and I/O controller 120 via communication infrastructure 112.

I/O controller 120 generally represents any type or form of module capable of coordinating and/or controlling the input and output functions of a computing device. For example, I/O controller 120 may control or facilitate transfer of data between one or more elements of computing system 110, such as processor 114, system memory 116, communication interface 122, display adapter 126, input interface 130, and storage interface 134.

Communication interface 122 broadly represents any type or form of communication device or adapter capable of facilitating communication between example computing system 110 and one or more additional devices. For example, communication interface 122 may facilitate communication between computing system 110 and a private or public network including additional computing systems. Examples of communication interface 122 include, without limitation, a wired network interface (such as a network interface card), a wireless network interface (such as a wireless network interface card), a modem, and any other suitable interface. In one embodiment, communication interface 122 provides a direct connection to a remote server via a direct link to a network, such as the Internet. Communication interface 122 may also indirectly provide such a connection through any other suitable connection.

Communication interface 122 may also represent a host adapter configured to facilitate communication between computing system 110 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 122 may also allow computing system 110 to engage in distributed or remote computing. For example, communication interface 122 may receive instructions from a remote device or send instructions to a remote device for execution.

As illustrated in FIG. 1, computing system 110 may also include at least one display device 124 coupled to communication infrastructure 112 via a display adapter 126. Display device 124 generally represents any type or form of device capable of visually displaying information forwarded by display adapter 126. Similarly, display adapter 126 generally represents any type or form of device configured to forward graphics, text, and other data for display on display device 124.

As illustrated in FIG. 1, computing system 110 may also include at least one input device 128 coupled to communication infrastructure 112 via an input interface 130. Input device 128 generally represents any type or form of input device capable of providing input, either computer- or human-generated, to computing system 110. Examples of input device 128 include, without limitation, a keyboard, a pointing device, a speech recognition device, or any other input device.

As illustrated in FIG. 1, computing system 110 may also include a primary storage device 132 and a backup storage device 133 coupled to communication infrastructure 112 via a storage interface 134. Storage devices 132 and 133 generally represent any type or form of storage device or medium capable of storing data and/or other computer-readable instructions. For example, storage devices 132 and 133 may be a magnetic disk drive (e.g., a so-called hard drive), a floppy disk drive, a magnetic tape drive, an optical disk drive, a flash drive, or the like. Storage interface 134 generally represents any type or form of interface or device for transferring data between storage devices 132 and 133 and other components of computing system 110.

In one example, databases 140 may be stored in primary storage device 132. Databases 140 may represent portions of a single database or computing device or it may represent multiple databases or computing devices. For example, databases 140 may represent (be stored on) a portion of computing system 110 and/or portions of example network architecture 200 in FIG. 2 (below). Alternatively, databases 140 may represent (be stored on) one or more physically separate devices capable of being accessed by a computing device, such as computing system 110 and/or portions of network architecture 200.

Continuing with reference to FIG. 1, storage devices 132 and 133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 132 and 133 may also include other similar structures or devices for allowing computer software, data, or other computer-readable instructions to be loaded into computing system 110. For example, storage devices 132 and 133 may be configured to read and write software, data, or other computer-readable information. Storage devices 132 and 133 may also be a part of computing system 110 or may be separate devices accessed through other interface systems.

Many other devices or subsystems may be connected to computing system 110. Conversely, all of the components and devices illustrated in FIG. 1 need not be present to practice the embodiments described herein. The devices and subsystems referenced above may also be interconnected in different ways from that shown in FIG. 1. Computing system 110 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 110. All or a portion of the computer program stored on the computer-readable medium may then be stored in system memory 116 and/or various portions of storage devices 132 and 133. When executed by processor 114, a computer program loaded into computing system 110 may cause processor 114 to perform and/or be a means for performing the functions of the example embodiments described and/or illustrated herein. Additionally or alternatively, the example embodiments described and/or illustrated herein may be implemented in firmware and/or hardware.

Figure 2:
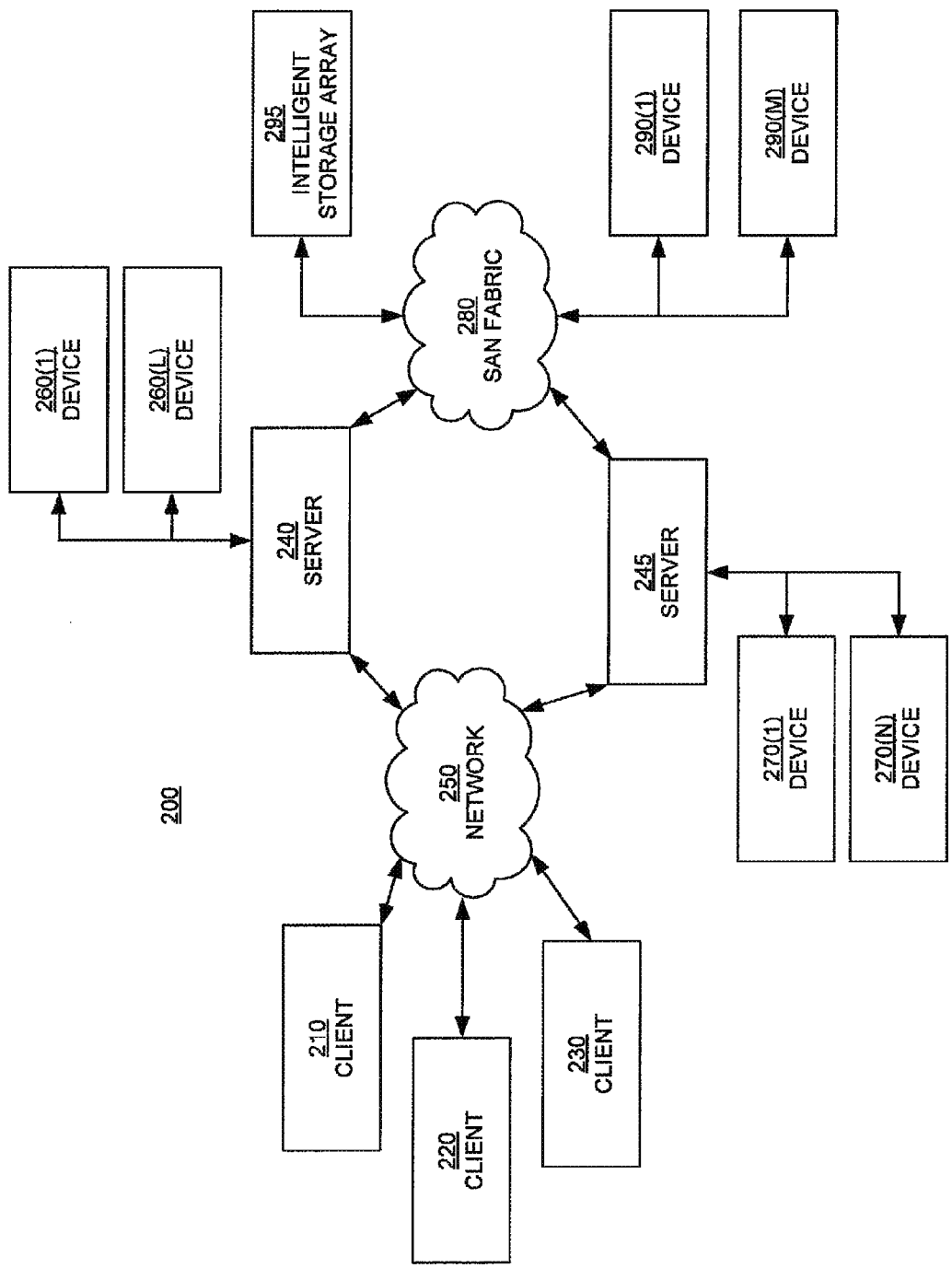
FIG. 2 is a block diagram of an example of a network architecture capable of implementing embodiments of the present disclosure.

FIG. 2 is a block diagram of an example of a network architecture 200 in which client systems 210, 220, and 230 and servers 240 and 245 may be coupled to a network 250. Client systems 210, 220, and 230 generally represent any type or form of computing device or system, such as computing system 110 of FIG. 1.

Similarly, servers 240 and 245 generally represent computing devices or systems, such as application servers or database servers, configured to provide various database services and/or run certain software applications. Network 250 generally represents any telecommunication or computer network including, for example, an intranet, a wide area network (WAN), a local area network (LAN), a personal area network (PAN), or the Internet.

As illustrated in FIG. 2, one or more storage devices 260(1)-(L) may be directly attached to server 240. Similarly, one or more storage devices 270(1)-(N) may be directly attached to server 245. Storage devices 260(1)-(L) and storage devices 270(1)-(N) generally represent any type or form of storage device or medium capable of storing data and/or other computer-readable instructions. Storage devices 260(1)-(L) and storage devices 270(1)-(N) may represent network-attached storage (NAS) devices configured to communicate with servers 240 and 245 using various protocols, such as Network File System (NFS), Server Message Block (SMB), or Common Internet File System (CIFS).

Servers 240 and 245 may also be connected to a storage area network (SAN) fabric 280. SAN fabric 280 generally represents any type or form of computer network or architecture capable of facilitating communication between storage devices. SAN fabric 280 may facilitate communication between servers 240 and 245 and storage devices 290(1)-(M) and/or an intelligent storage array 295. SAN fabric 280 may also facilitate, via network 250 and servers 240 and 245, communication between client systems 210, 220, and 230 and storage devices 290(1)-(M) and/or intelligent storage array 295 in such a manner that devices 290(1)-(M) and array 295 appear as locally attached devices to client systems 210, 220, and 230. As with storage devices 260(1)-(L) and storage devices 270(1)-(N), storage devices 290(1)-(M) and intelligent storage array 295 generally represent any type or form of storage device or medium capable of storing data and/or other computer-readable instructions.

With reference to computing system 110 of FIG. 1, a communication interface, such as communication interface 122, may be used to provide connectivity between each client system 210, 220, and 230 and network 250. Client systems 210, 220, and 230 may be able to access information on server 240 or 245 using, for example, a Web browser or other client software. Such software may allow client systems 210, 220, and 230 to access data hosted by server 240, server 245, storage devices 260(1)-(L), storage devices 270(1)-(N), storage devices 290(1)-(M), or intelligent storage array 295. Although FIG. 2 depicts the use of a network (such as the Internet) for exchanging data, the embodiments described herein are not limited to the Internet or any particular network-based environment.

Returning to FIG. 2, in one embodiment, all or a portion of one or more of the example embodiments disclosed herein are encoded as a computer program and loaded onto and executed by server 240, server 245, storage devices 260(1)-(L), storage devices 270(1)-(N), storage devices 290(1)-(M), intelligent storage array 295, or any combination thereof. All or a portion of one or more of the example embodiments disclosed herein may also be encoded as a computer program, stored in server 240, run by server 245, and distributed to client systems 210, 220, and 230 over network 250.

Figure 3:
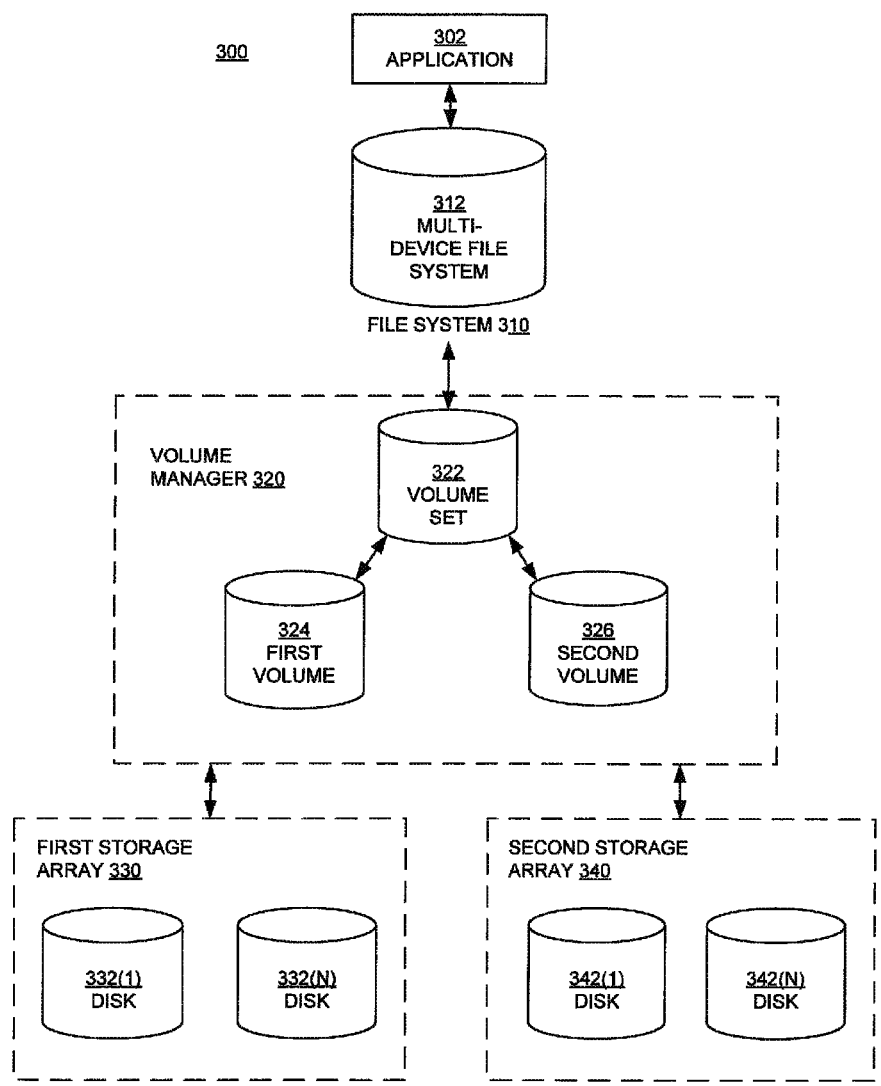
FIG. 3 is a block diagram of an example of a storage system capable of implementing embodiments of the present disclosure.

FIG. 3 is a block diagram of an example of a storage system 300 upon which embodiments of the present disclosure may be implemented. System 300 may include an application 302 in communication with a file system 310. File system 310 may include a multi-device file system 312 for multi-device storage. Multi-device storage generally refers to the use of different virtual or physical storage devices that provide differentiated storage for computing systems.

Storage system 300 can support multi-volume file systems through multi-device file system 312 and can provide automatic policy-based placement of portions (e.g., extents or blocks) of files within file system 310. A multi-volume file system may include file systems that occupy two or more virtual storage volumes. A multi-volume file system may present a single name space, making the existence of multiple volumes transparent to users and applications while maintaining awareness of each volume's identity, making it possible to control the locations at which portions of files are stored. In one embodiment, all files in multi-volume file system may be part of the same name space and are accessed and manipulated as though they occupy a single volume.

System 300 may also include a volume manager 320. Volume manager 320 may implement software-based virtualization for facilitating multi-device storage in the form of virtual volumes configured from multiple hardware devices. Volume manager 320 may include a volume set 322. Volume set 322 may be divided into a first volume 324 and a second volume 326. For example, first volume 324 may include a first storage array 330 (e.g., disk 332(1) through disk 332(N)). Similarly, second volume 326 may include a second storage array 340 (e.g., disk 342(1) through disk 342 (N)).

Volume set 322 may be configured in a variety of manners. For example, first volume 324 and/or second volume 326 may be configured from enterprise disk array logical unit number units (LUNs), mid-range disk array LUNs, and/or disks connected directly to their host systems. First volume 324 and/or second volume 326 may also represent more complex configurations, such as mirrored volumes configured from RAID (Redundant Array of Independent Disks) LUNs presented by two disk arrays.

Figure 4:
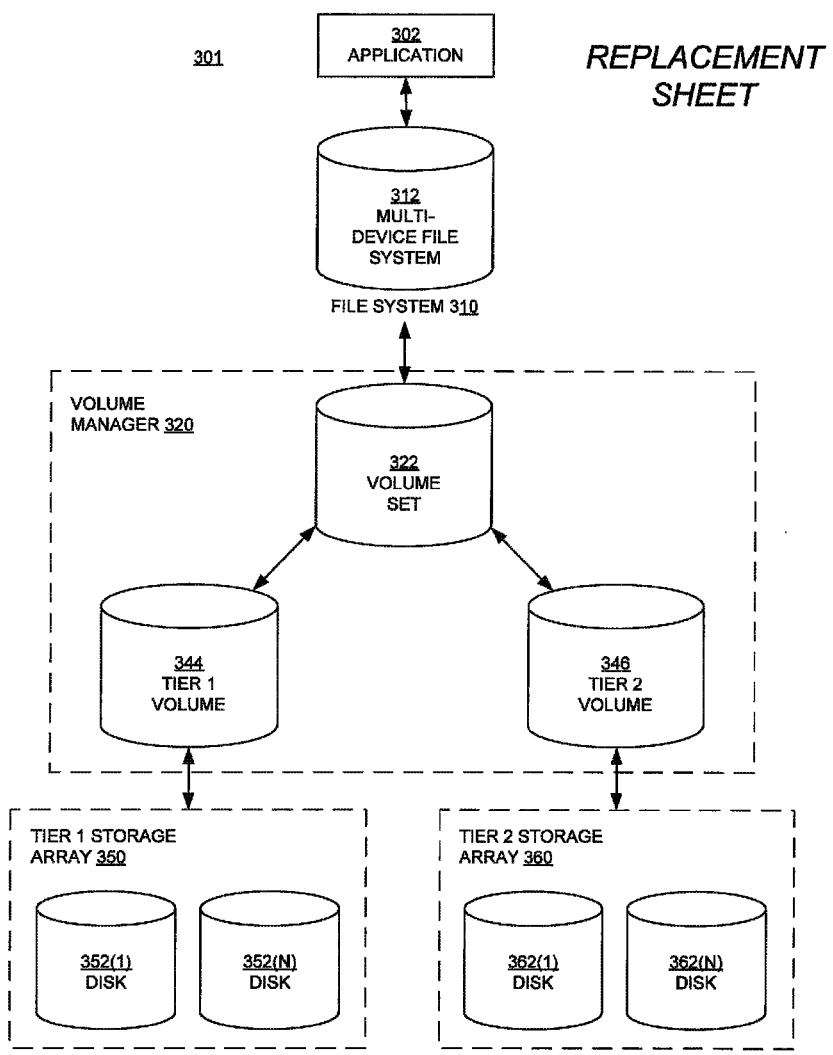
FIG. 4 is a block diagram of an example of a multi-tier storage system upon which embodiments of the present disclosure may be implemented.

FIG. 4 is a block diagram of an example of a multi-tier storage system 301 upon which embodiments of the present disclosure may be implemented. In this embodiment, file system 310 includes a multi-device file system 312 for multi-tier storage. File system 310 may also be referred to as dynamic storage. Multi-tier storage generally refers to the use of virtual or physical storage devices with different characteristics to provide differentiated storage for computing systems. Each tier may be ranked based on those characteristics. For example, storage devices in a multi-device file system may have different I/O performance, availability, and/or cost characteristics and may be ranked accordingly. In other words, higher ranked tiers may result in higher performance at a higher cost/price, and lower ranked tiers may result in lower performance at a reduced cost/price. Storage system 301 can also support multi-volume file systems through multi-device file system 312 and can provide automatic policy-based placement of portions (e.g., extents or blocks) of files within file system 310.

In the FIG. 4 embodiment, volume manager 320 may implement software-based virtualization for facilitating multi-tier storage in the form of virtual volumes configured from multiple hardware devices. Volume set 322 may be divided into a tier 1 volume 344 and a tier 2 volume 346. For example, tier 1 volume 344 may include tier 1 storage array 350 (e.g., disk 352(1) through disk 352(N)). Similarly, tier 2 volume 346 may include a tier 2 storage array 360 (e.g., disk 362(1) through disk 362 (N)). Tier 1 volume 344 and/or tier 2 volume 346 may be configured from enterprise disk array LUNs, mid-range disk array LUNs, and/or disks connected directly to their host systems. Tier 1 volume 344 and/or tier 2 volume 346 may also represent more complex configurations, such as mirrored volumes configured from RAID (Redundant Array of Independent Disks)-5 LUNs presented by two disk arrays.

Figure 5:
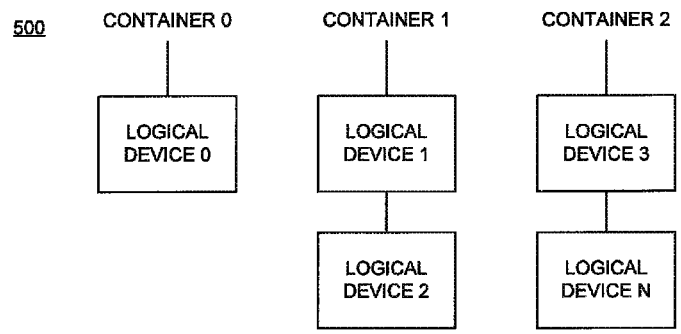
FIG. 5 is a block diagram illustrating a file system that is subdivided into containers according to an embodiment of the present disclosure.

FIG. 5 is a block diagram illustrating a file system 500 that is subdivided into containers according to an embodiment of the present disclosure. File system 500 is analogous to file system 300 of FIG. 3. In the example of FIG. 5, file system 500 includes three containers 0, 1, and 2; however, the invention is not so limited.

Container 0 of FIG. 5 includes a single logical device (e.g., a volume or LUN), container 1 includes two logical devices, and container 2 includes N logical devices. Each container includes a respective non-overlapping set of the logical devices. That is, each container includes one or more of logical devices, and each logical device is associated with a single container.

Figure 6:
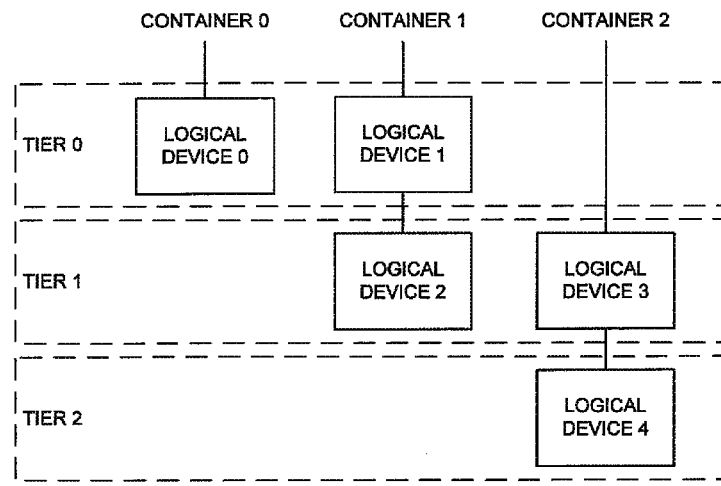
FIG. 6 is a block diagram illustrating a multi-tier file system that is subdivided into containers according to an embodiment of the present disclosure.

FIG. 6 is a block diagram illustrating a file system 600 that is subdivided into containers according to another embodiment of the present disclosure. File system 600 is analogous to file system 301 of FIG. 4. While three containers are shown in FIG. 6, the invention is not so limited.

Container 0 of FIG. 6 includes a single logical device (e.g., volume or LUN) in tier 0, container 1 includes a logical device in tier 0 and a logical device in tier 1, and container 2 includes a logical device in tier 1 and a logical device in tier 2. In other words, a container can span multiple tiers. If each tier is considered to be a volume unto itself, then a container can carve out a portion of a volume/tier.

The containers of FIGS. 5 and 6 can be of different sizes (measured in terms of memory), and the size of each container can grow or shrink as needed. In one embodiment, a maximum size is specified for each container. Thus, in such an embodiment, the number of files that can be associated with any one container is also limited. Storage allocated to one file is restricted to belonging to the volumes that make up one container.

Each container is associated with its own set of metadata structures such as, but not limited to, a free block list, an inode list or inode array, and other structures that might be typically specified for the entire file system.

A container can be defined within a file system in various ways. The manner in which a container is defined depends on how the file system is implemented. In general, each container can manage the inodes and/or data blocks that are associated with it.

For example, a file system may be extent-based—an "extent" is defined as one or more adjacent blocks of data within the file system. When data blocks are allocated to a file in an extent-based file system, the blocks are allocated as a group, rather than one block at a time. In an extent-based system, the blocks of data allocated for a file can be associated with a single logical device. A descriptor associated with the file identifies which logical device the blocks are stored in. That descriptor, along with a physical block address or offset within the logical device, can be used to define a container. That is, a container can be defined as one or more descriptor values (logical device identifiers) and offsets.

As another example, an inode is associated with each file, and each inode can point to the data blocks associated with a file, or each inode can point to a block map that points to the data blocks. A container can be defined as a selected group of inodes; each inode is associated with a single container. Alternatively, a field that identifies a container can be included in each inode. In general, when a file is created and an inode is assigned to the file, that inode can be associated with a particular container in some way.

According to embodiments of the disclosure, each container can be checked and repaired independently, which leads to much faster file system consistency checks and repairs because it is possible to check and repair only the corrupted part of the file system instead of the entire file system. Also, only a portion of the file system (specifically, the container or containers being checked) may need to be taken offline during a file system consistency check, leaving the remainder of the file system accessible to other system components and processes.

More specifically, instead of executing a conventional file system consistency check, a partial file system consistency check is specified and executed. In one embodiment, one or more containers are identified (selected), and the partial file system consistency check is performed only on the selected container(s). If, for example, corruption of metadata belonging to a particular container is detected, then only that container is marked for a file system consistency check.

A container or containers can be selected for a partial file system consistency check using one of the mechanisms identified above. For example, the file system consistency check can be constrained to a list of inodes associated with a particular container or containers.

By checking and repairing only a selected container or containers, a file system consistency check can be run with the other portions of the file system online. Thus, the entire file system does not need to be stopped. Instead, only the container or containers that are being checked and repaired are frozen or quiesced. Consequently, only applications that need to access files that are associated with the frozen container(s) will be blocked or unavailable while a partial file system consistency check is being run.

A number of operations can be performed during a partial file system consistency check. For example, file names associated with the selected container(s) can be checked to make sure that they are valid file names (e.g., they do not include invalid characters). Inodes associated with the selected container(s) can be checked to verify that they actually exist and are files. The number of back pointers associated with those inodes can be checked to make sure that it equals the number of hard links to the inodes. Other information associated with the selected inodes can be checked. For example, the size of the file associated with an inode can be checked to make sure it is within reasonable bounds. The number of free inodes can be determined. Other types of checks known in the art can be performed on the selected inodes.

Furthermore, if inconsistencies are detected, then the checking and repair utility can implement corrective actions. For example, if the stored link count and the actual link count do not match, then the stored link count can be updated with the actual link count. If a directory entry points to an unallocated inode, then the entry in the directory can be removed. Other corrective actions known in the art can be performed depending on the type of inconsistency that is detected.

Figure 7:
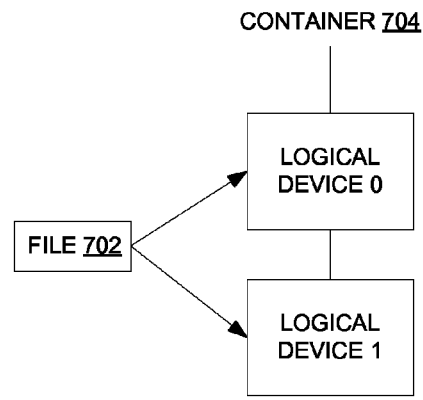
FIG. 7 is a block diagram illustrating the mapping of a file to a container according to embodiments of the present disclosure.

FIG. 7 is a block diagram illustrating the mapping of a file 702 to a container 704 according to embodiments of the present disclosure. Storage allocated to one file is restricted to belonging to the volumes that make up one container. In the example of FIG. 7, the container 704 includes two logical devices and the file is mapped to both logical devices; however, the present invention is not so limited. A file may be mapped to a single logical device or to multiple logical devices, and a container may include a single logical device or multiple logical devices. Thus, a file can span multiple logical devices (e.g., volumes or LUNs) and still be in a single container.

Once a file is created, subsequent writes to the file may increase the size of the file. If more memory is needed for the file, then the container associated with the file is identified, and additional memory is allocated to that file within that container. If more memory is needed for the container, then additional memory can be allocated to that container within a logical device associated with that container. As noted above, a container can span multiple logical devices.

Figure 8:
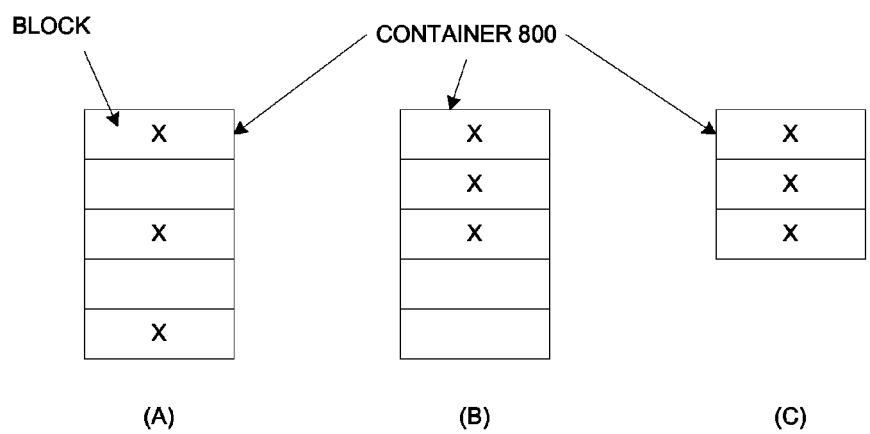
FIG. 8 is a representation of data blocks in a data structure (e.g., a container or a logical device) according to embodiments of the present disclosure.

If a file is deleted, or if the file decreases in size, then the freed up blocks remain with the container that held the file. FIG. 8 is a representation of data blocks in a data structure 800 (e.g., a container or a logical device) according to embodiments of the present disclosure. In (A), certain blocks (those containing an "X") are in use, while the other blocks are free.

In (B), the free blocks are reorganized toward the end of the data structure 800. In this manner, the problem of defragmentation, which might arise due to partitioning the file system into containers, is addressed.

In (C), the data structure 800 is reduced in size. In one embodiment, if the amount of free (available) memory in the structure exceeds a defined threshold value, then the structure is reduced in size. In the example of FIG. 8, the data structure is reduced in size; however, as noted above, the freed blocks can remain within the data structure (e.g., container) as shown in (B).

Figure 9:
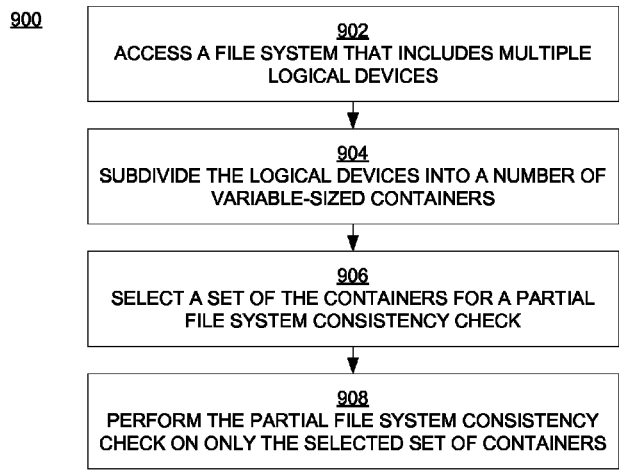
FIG. 9 is a flowchart of a computer-implemented process for performing file system consistency checks according to embodiments of the disclosure.
Figure 10:
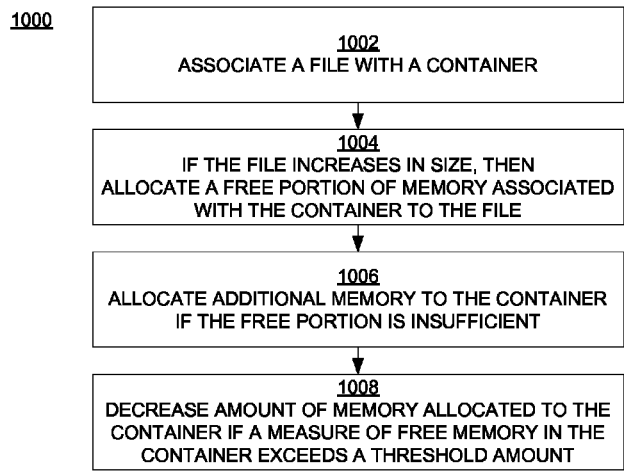
FIG. 10 is a flowchart of a computer-implemented process for managing containers according to embodiments of the disclosure.

FIGS. 9 and 10 are flowcharts 900 and 1000, respectively, of computer-implemented processes for performing file system consistency checks according to embodiments of the disclosure. Flowcharts 900 and 1000 can be implemented as computer-executable instructions residing on some form of computer-readable storage medium (e.g., using computing system 110 of FIG. 1).

In block 902 of FIG. 9, a file system that includes multiple logical devices is accessed.

In block 904, the logical devices are subdivided (partitioned) into a number of containers. The containers include respective non-overlapping sets of the logical devices. That is, each of the containers includes one or more of the logical devices, and each of the logical devices is associated with a single one of the containers. An amount of memory allocated to a container is dynamic.

In block 906, a set of the containers is selected for a partial file system consistency check. The set can include a single container or multiple containers. In one embodiment, inodes associated with the selected set of the containers are identified, and the file system consistency check is constrained to a set of the inodes associated with the set of the containers.

In block 908, the partial file system consistency check is performed and completed on only the selected set of the containers instead of on the entire file system.

In block 1002 of FIG. 10, a file is associated with a container. That is, a file is created within a container.

In block 1004, a free portion of memory associated with the container is allocated to the file if the file subsequently increases in size.

In block 1006, additional memory is allocated to the container if the free portion is insufficient.

In block 1008, an amount of memory allocated to the container is decreased if, for example, a measure of free memory in the container exceeds a threshold amount. The measure may be, for example, the number of free data blocks.

In summary, according to embodiments of the disclosure, a large file system can be divided into several smaller entities (containers) such that each container can be checked and repaired independently, which leads to much faster file system consistency checks and repairs. Only a portion of the file system (specifically, the container being checked) may need to be taken offline during a file system consistency check, leaving the remainder of the file system accessible to other system components and processes.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A non-transitory computer-readable storage medium having computer-executable instructions for causing a computer system to perform a method comprising:
   accessing a file system comprising a plurality of logical devices, wherein said file system comprises a multi-tier file system that includes a first tier having a first hardware configuration and a second tier having a second hardware configuration different from the first hardware configuration, the second hardware configuration having a performance different from the first hardware configuration;
   subdividing said logical devices into a plurality of containers, wherein said containers comprise respective non-overlapping sets of said logical devices, wherein an amount of memory allocated to each container is dynamic, wherein a first of the plurality of containers includes a logical device entirely arranged in the first tier and a second of the plurality of containers includes logical devices spanning the first tier and the second tier; wherein said logical devices comprise devices identified by LUNs (logical unit numbers), and wherein said LUNs are used to define members of said containers;
   dynamically reducing an amount of memory allocated to one of said containers when a measure of free memory in said one container exceeds a threshold amount due to file activity within said one container, wherein dynamically reducing comprises reorganizing free blocks of said one container to an end of said one container;
   selecting a set of said containers for a file system consistency check; and
   performing said file system consistency check on only said set of said containers such that a remainder of containers within said file system are not checked, wherein said set of containers is offline and inaccessible to applications and said remainder of containers is online and accessible to applications during said file system consistency check, and wherein said file system consistency check comprises reading and checking a list of inodes, reading a block map associated with each inode in said list of inodes, generating an inode list for each container within said set of containers, and constraining said file system consistency check to inodes associated with said set of containers, wherein a plurality of operations are performed during said file system consistency check, the plurality of operations including a check of file names associated with each of the containers within the set of containers, a check of inodes associated with each of the containers within the set of containers, a check of back pointers associated with the inodes, and a determination of a number of free inodes, and wherein one of a plurality of corrective measures are performed when an error is detected during one of the plurality of operations, the corrective measure performed depending upon the error detected.

2. The non-transitory computer-readable storage medium of claim 1, wherein said logical devices comprise volumes managed by a volume manager of said file system.

3. The non-transitory computer-readable storage medium of claim 1, wherein said method further comprises:
   creating a file entirely within one of the first container and the second container, wherein the file is mapped to a plurality of logical devices within the first container or the second container;

allocating, to said file, a free portion of memory associated with the one of said first container and said second container when said file subsequently increases in size; and allocating, to the one of said first container and said second container, additional memory when said free portion is insufficient.

4. The non-transitory computer-readable storage medium of claim 1, wherein a first performance characteristic of said first hardware configuration of said first tier is ranked higher than a second performance characteristic of said second hardware configuration of said second tier.

5. The non-transitory computer-readable storage medium of claim 1, further comprising:

analyzing metadata associated with each of the plurality of containers to determine whether the metadata of each of the plurality of containers has been corrupted and marking each of the plurality of containers that has been determined to have corrupted metadata as the set of said containers.

6. The non-transitory computer-readable storage medium of claim 5, wherein the metadata associated with each of the plurality of containers includes a free block list and the inode list.

7. A computer system comprising:

a processor; and memory coupled to said processor and having stored therein instructions that, when executed by said computer system, cause said computer system to execute operations comprising:

accessing a file system comprising a plurality of logical devices, wherein said file system comprises a multi-tier file system that includes a first tier having a first hardware configuration and a second tier having a second hardware configuration different from the first hardware configuration, the second hardware configuration having a performance different from the first hardware configuration;

subdividing said logical devices into a plurality of containers, wherein each of said containers comprises one or more of said logical devices and wherein each of said logical devices is associated with a single one of said containers, wherein an amount of memory allocated to one of a first container and a second container is increased when more memory is needed for a file associated with the one of said first container and said second container, wherein the first container includes a logical device entirely arranged in the first tier and the second container includes logical devices spanning the first tier and the second tier, and wherein the file is entirely within the first container or the second container and mapped to a plurality of logical devices within the first container or the second container;

selecting a set of said containers for a file system consistency check;

performing said file system consistency check on only said set of said containers such that a remainder of containers within the file system are not checked before subsequently performing another file system consistency check on another set of said containers, wherein said set of containers is offline and inaccessible to applications and said remainder of containers is online and accessible to applications during said file system consistency check, and wherein said file system consistency check comprises reading and checking a list of inodes, reading a block map associated with each inode in said list of inodes, generating an inode list for each container within said set of containers, and constraining said file system consistency check to inodes associated with said set of containers, wherein a plurality of operations are performed during said file system consistency check, the plurality of operations including a check of file names associated with each of the containers within the set of containers, a check of inodes associated with each of the containers within the set of containers, a check of back pointers associated with the inodes, and a determination of a number of free inodes, and wherein one of a plurality of corrective measures are performed when an error is detected during one of the plurality of operations, the corrective measure performed depending upon the error detected; and dynamically reducing said amount of memory allocated to the one of said first container and said second container when a measure of free memory in the one of said first container and said second container exceeds a threshold amount due to file activity within the one of said first container and said second container, wherein said dynamically reducing comprises reorganizing free blocks in the one of said first container and said second container to an end of the one of said first container and said second container to remove gaps between blocks in said container that are in use.

8. The computer system of claim 7, wherein said logical devices are virtual storage devices selected from a group comprising: volumes and devices identified by LUNs (logical unit numbers).

9. The computer system of claim 7, said operations further comprising:

allocating, to said file, a free portion of said memory allocated to the one of said first container and said second container when said file increases in size; and increasing said amount of memory allocated to said first container or said second container when said free portion is insufficient.

10. The computer system of claim 7, said operations further comprising:

identifying inodes associated with each of said containers; and constraining said file system consistency check to a set of said inodes associated with said set of said containers.

11. A computer-implemented method comprising:

accessing a file system comprising a plurality of logical devices, wherein said file system comprises a multi-tier file system that includes a first tier having a first hardware configuration and a second tier having a second hardware configuration different from the first hardware configuration, the second hardware configuration having a performance different from the first hardware configuration, wherein said file system is subdivided into a plurality of containers, wherein said containers comprise respective non-overlapping sets of said logical devices, wherein an amount of memory allocated to each container is dynamic, wherein said logical devices comprise devices identified by LUNs (logical unit numbers), wherein said LUNs are used to define members of said containers, and wherein a first of the plurality of containers includes a logical device entirely arranged in the first tier and a second of the plurality of containers includes logical devices spanning the first tier and the second tier;

dynamically reducing an amount of memory allocated to one of said containers when a measure of free memory in said one container exceeds a threshold amount due to file activity within said one container, wherein the dynamically reducing comprises reorganizing free blocks of said one container to an end of said one container;

selecting a set of said containers for a file system consistency check; and completing said file system consistency check on only said set such that a remainder of containers within the file system are not checked before subsequently performing another file system consistency check on another set of said containers, wherein said set of containers is offline and inaccessible to applications and said remainder of containers is online and accessible to applications during said file system consistency check, wherein said file system consistency check comprises reading and checking a list of inodes, reading a block map associated with each inode in said list of inodes, generating an inode list for each container within said set of containers, and constraining said file system consistency check to inodes associated with said set of containers, wherein a plurality of operations are performed during said file system consistency check, the plurality of operations including a check of file names associated with each of the containers within the set of containers, a check of inodes associated with each of the containers within the set of containers, a check of back pointers associated with the inodes, and a determination of a number of free inodes, and wherein one of a plurality of corrective measures are performed when an error is detected during one of the plurality of operations, the corrective measure performed depending upon the error detected.

12. The method of claim 11, further comprising:

creating a file entirely within one of the first container and the second container, wherein the file is mapped to a plurality of logical devices within the first container or the second container;

allocating, to said file, a free portion of said memory allocated to the one of said first container and said second container when said file increases in size; and increasing said amount of memory allocated to the one of said first container and said second container when said free portion is insufficient.

* * * * *